United States Patent Office 3,059,007
Patented Oct. 16, 1962

3,059,007
PRODUCTION OF CARBOXYLIC ACIDS
Johan M. Vos and Rudi de Vries, Amsterdam, Netherlands, assignors to Shell Oil Company, New York, N.Y., a corporation of Delaware
No Drawing. Filed Jan. 3, 1961, Ser. No. 79,967
Claims priority, application Netherlands Jan. 15, 1960
4 Claims. (Cl. 260—413)

This invention relates to the production of carboxylic acids. The invention relates more particularly to improvements in the production of carboxylic acids from starting materials comprising carbon monoxide, monoolefins and water.

It is known that organic acids are obtained by contacting mixtures containing carbon monoxide, water and olefinically unsaturated organic compound, with certain specific catalysts under controlled conditions of temperature and pressure. Processes have been disclosed heretofore which rely upon the use of exceedingly high pressures, often in combination with relatively high temperatures, generally in excess of 150° C. and often higher than 375° C. These processes have not led to practical scale application. This is attributable not only to inability to obtain therewith consistently desired carboxylic acids in yields commensurate with practical scale operation, but because the high pressures, often many hundreds of atmospheres, combined with the corrosiveness of the reaction mixtures made too heavy a demand on practical scale equipment.

More recently, there was discovered the low temperature, liquid phase process for the production of carboxylic acids from olefinically unsaturated compounds, carbon monoxide and water, bringing the production of carboxylic acids by this route within the realm of practicability. In the low temperature, liquid phase carboxylic acid process interaction of the starting materials is carried out at temperatures in the range of from about —25 to about 100° C. Generally temperatures in the lower range of, for example, from about —10 to about 80° C. are satisfactory. The process is executed at relatively low pressures in the range of from about 20 to about 150 atmospheres. Essential to the execution of the low temperature, liquid phase process is the presence of a liquid, highly acidic inorganic catalyst such as, for example, one selected from the group consisting of concentrated sulfuric acid (above 90% strength); hydrofluoric acid, chlorosulfonic acid; mixtures of hydrogen fluoride and boron trifluoride; mixtures of boron trifluoride and a polybasic inorganic acid such as, for example, phosphoric acid, sulfuric acid and the like; monohydroxy fluoboric acid optionally with added polybasic inorganic acid such as sulfuric or phosphoric acid. The low temperature, liquid phase carboxylic acid process is generally carried out in two stages. In the first stage the olefinic charge is reacted with carbon monoxide in the presence of the acid catalyst in liquid phase under substantially anhydrous conditions. Water is then added to the resulting reaction mixture in the second stage of the process. A suitable process of this type is described in U.S. Patent 2,831,877 issued to Herbert Koch.

A process enabling the execution of the low temperature, liquid phase carboxylic acid process in substantially single stage is disclosed and claimed in copending application Serial No. 858,609, filed December 10, 1959. In accordance with the process described in said copending application, use of a single stage is made possible by conditions comprising the use of a substantially homogeneous liquid phase of relatively constant composition at substantially constant temperature in the reaction zone. Modifications of the suitable low temperature, liquid phase carboxylic acid process are exemplified by the processes defined and claimed in copending applications Serial Nos. 858,796 and 858,797, filed December 10, 1959.

Under the conditions of these low temperature, liquid phase carboxylic acid producing processes, olefins having at least three carbon atoms to the molecule result in a reaction mixture in which the predominating organic acid is a secondary or tertiary carboxylic acid. The organic acids obtained will generaly correspond to the compounds obtained by removing an olefinic linkage in the olefinic charge and attaching a carboxy group (—COOH) directly to one, and a hydrogen atom to the other, of the two olefinically-unsaturated carbon atoms linked by the olefinic bond in the charge material. Propylene results in isobutyric acid; butene-1 and butene-2 in 2-methyl butyric acid; isobutylene in trimethylacetic acid; octene-1 and octene-2 in 2-methyl octenoic acid; cyclohexene in acids comprising methyl cyclopentane carboxylic acid and cyclohexane carboxylic acid; etc. Mixtures of olefins will result in the obtaining of mixtures of fatty acids having on the average one more carton atom to the molecule than the olefinic components of the charge.

It is to improvements in the low temperature, liquid phase process for the production of carboxylic acids from olefinically unsaturated compounds, carbon monoxide and water as defined hereinabove that the present invention is directed.

Available unsaturated organic charge materials comprise the commercially available unsaturated hydrocarbons predominating in mono-olefins such as, for example, propylene, butylene-1, butylene-2, isobutylene, branched or unbranched pentenes, hexenes, heptenes, octenes, nonenes, decenes and high alkenes; polymers and copolymers of alkenes, such as di-isobutylene, propylene tetramer; cyclic alkenes, such as cyclopentene and cyclohexene. Commercially available mixtures comprising these alkenes are also used, for example, olefin-containing hydrocarbon fractions such as obtained by thermal vapor phase cracking of paraffin wax in the presence of steam. These fractions not only contain alkenes but generally also some paraffins, naphthenes and aromatics, which usually do not take part in the synthesis. Their presence often promotes the separation into layers of the reactor effluence; the same also being true of the alkenes unconverted during the reaction. Olefin-rich products obtained in the Fischer-Tropsch synthesis carried out under moderate pressure also constitutes examples of suitable unsaturated charge to the process. Monoolefins generally employed comprise those having from three to twenty carbon atoms to the molecule. Olefin fractions consisting of mixtures of monoolefins having, for example, from about eight to about ten carbon atoms to the molecule result in the obtaining of mixed carboxylic acids of particular utility in the production of valuable derivatives, such as mixed epoxy compounds, therefrom.

The members of the broad class of suitable monoolefinic charge materials as commercially available generally contain admixed therewith varying amounts of unsaturated compounds having two or more olefinically unsaturated bonds (referred to herein as polyalkenes). These include, for example, diolefins having substantially the same number of carbon atoms as monoolefinic constituents of the charge. Heretofore, it was generally believed that monoolefinic and polyolefinic compounds were equally suited as charge material to the process and that the poly-unsaturated components generally unavoidably present in commercially available monoolefinic charge material were a desirable adjunct.

It has now been found that loss in yield and depreciation of product quality particularly with respect to color, often encountered when charging commercially available monoolefins as the unsaturated organic reactant, are directly attributable to at least a substantial degree to the presence in the charge of polyolefinically unsaturated compounds, such as diolefins, etc. Loss in yield of desired carboxylic acid product is generally accompanied by substantial increase in conversion to by-products comprising polymeric materials and color-forming bodies. Applicants have now also found that substantial increase in yield of desired carboxylic acid and improvement in product quality, particularly with respect to absence of coloration, is obtained in the low temperature liquid phase process for the production of carboxylic acids from commercially available monoolefins, carbon monoxide and water by effecting the removal of at least a substantial part of the polyolefinically unsaturated components from the monoolefinic charge before its subjection to reaction with the carbon monoxide.

In accordance with the process of the invention the production of carboxylic acid in the low temperature, liquid phase process wherein a monoolefinic charge consisting essentially of monoolefinic hydrocarbons having at least three carbon atoms to the molecule in admixture with polyolefinically unsaturated components is reacted in liquid phase with carbon monoxide and water at a temperature of from about −25° to about 100° C., and a pressure of from about 20 to about 150 atmospheres in the presence of a liquid, highly acidic, inorganic catalyst, is executed with substantially increased yield and improved product quality, particularly with respect to absence of discoloration, by removing at least a substantial part of said polyolefinically unsaturated components from said monoolefinic charge before subjecting said monoolefinic charge to said reaction with said carbon monoxide and water.

The content of polyolefinically unsaturated compounds, such as, for instance, diolefins, in the monoolefinic charge to be treated may vary widely within the scope of the invention. Thus, the polyolefinically unsaturated compounds may be present in contaminating amounts in the range of from only a fraction of a percent to about 5 to 10 percent by weight or may even range considerably higher.

The process of the invention is not limited with respect to the method used to effect the removal of at least a part of the polyolefinically unsaturated components from the monoolefinic charge. Suitable polyolefinically unsaturated component removal treatments comprise those effecting physical separation of these contaminants from the monoolefinic charge or converting them in part or entirety to products which are substantially inert under the subsequent carboxylic acid forming reaction and/or to products which are more readily separable by ordinary practical scale means from the monoolefinic charge. Suitable treatments furthermore comprise those converting a part or all of the polyolefinically unsaturated components to monoolefins and/or to compounds which, under the carboxylic acid producing conditions, are converted to products readily separated from the desired carboxylic acid products.

Suitable methods of removing the polyolefinically unsaturated components, such as the di- and polyalkenes comprise, for example, one or more such steps as fractional distillation; azeotropic distillation; extractive distillation; extraction with selective solvents, such as aqueous solutions of cuprous salts, for example, cuprous chloride; selective polymerization; selective hydrogenation, for example, with catalysts containing copper, nickel or cobalt; and the like.

The particular method preferably employed will depend to some extent on the properties of the mixture to be treated. If, for instance, the mono-alkanes and the di- and/or polyalkenes present in the mixture have boiling points, or boiling ranges, which lie close to each other, fractional distillation is, of course, less suitable.

A preferred method for effecting the removal of polyethylenically unsaturated constituents from the monoolefinic charge is selective polymerization, which may be carried out by passing the mixture in vapor phase over a catalyst consisting essentially of aqueous phosphoric acid supported on a carrier, for example, metallurgical coke. Suitable conditions comprise a pressure in the range of from about 1 to about 7 atm., a temperature from about 150° C. to about 250° C. and a contact time of from about 10 to about 500 seconds. Pressures in the range of from about 3 to about 7 atm., temperatures of from about 200° C. to about 250° C. and a contact time of from about 150 to about 250 seconds are used when it is desired to obtain a very low content of di- and/or polyalkenes (for example, less than 0.4%) in the treated monoolefinic charge. Another suitable method of selective polymerization is a sulfuric acid treatment, substantially under the conditions described in "The Science of Petroleum," vol. III, pages 1769–1778 (Oxford University Press, 1938). In accordance with this method, the monoolefinic charge to be treated is washed once, or several times, with about 0.5% by weight of sulfuric acid (of a concentration of about 98% by weight). After each wash any acid sludge formed is removed. The acid treated mixture is washed with a caustic alkali solution and then distilled; the polymerisate remaining behind as residue.

The most practical method of pretreating the monoolefinic charge, however, is selective hydrogenation. To this end the mixture to be treated is passed over a selective hydrogenation catalyst in the presence of hydrogen. Suitable selective hydrogenation methods comprise, for example, those disclosed in U.S. Patent 2,717,861 and Ind. Eng. Chem., 40, 2292–2301 (1948). Thus, for example, the mixture is passed in the vapor phase and in the presence of hydrogen over a catalyst consisting essentially of copper chromite supported on silica, or of nickel sulphide supported on alumina. The quantity of hydrogen used is preferably controlled in accordance with the quantity of di- and/or polyalkene to be removed. The molar ratio of hydrogen to di- and/or polyalkene is generally in the range of from about 1:1 to about 5:1. Suitable reaction conditions comprise, for example; temperature of from about 200° C. to about 300° C., pressures in the range of from about 1 to about 20 atm., a LHSV of from about 0.5 to about 20 (LHSV = liquid hourly space velocity, i.e., the number of liters of olefinic feed, calculated as liquid at normal temperature and pressure, passed over one litre of catalyst per hour). In the selective hydrogenation the di- and polyalkenes are largely converted into monoalkanes, thereby increasing the quantity of suitable starting material for the preparation of carboxylic acids in the mixture.

EXAMPLE

As starting material there was used an olefinic hydrocarbon fraction obtained by thermal vapor phase cracking of paraffin wax in the presence of steam, herein identified as fraction "A."

A portion of fraction "A" was subjected to selective catalytic hydrogenation by passage with hydrogen over a nickel sulfide catalyst under the following conditions:

LHSV _____ 2.0
Reactor inlet temperature, ° C_____ 250
Reactor outlet temperature, ° C_____ 260
Hydrogen pressure, atm_____ 10
Catalyst: NiS on alumina.

The resulting olefinic hydrocarbon mixture obtained in the hydrogenation treatment is referred to herein as fraction "B."

Properties of fractions "A" and "B" are set forth in the following Table I:

Table I

|  | Fraction "A" Before the selective hydrogenation | Fraction "B" After the selective hydrogenation |
|---|---|---|
| Maleic anhydride number | 48 | 0.2 |
| Boiling range, °C | 133–167 | 135–184 |
| Bromine number | 107 | 94 |
| Composition (percent by weight): | | |
| mono-olefins [a] | 72 | 76 |
| diolefins | 5 | 0 |
| aromatics | 7 | 7 |
| saturated aliphatic hydrocarbons | 12 | 13 |
| saturated cyclo-aliphatic hydrocarbons | 4 | 4 |

[a] The monoolefins consisted essentially of a mixture of monoolefins having from 8 to 10 carbon atoms to the molecule.

In an operation, identified herein as "Run A," the untreated monoolefinic charge, fraction "A" was reacted with carbon monoxide and water under the following low temperature, liquid phase, carboxylic acid-forming conditions.

In a continuous operation, "Run A," fraction "A," carbon monoxide and catalyst were introduced continuously at controlled rates into a stainless steel 5-liter reaction vessel having a convex bottom and provided with: a mechanically driven stirrer, a steam and water jacket to bring the reaction mixture to the desired temperature, supply lines for alkenes, carbon monoxide and catalyst, and lines for withdrawing liquid reaction mixture and gas phase. The rate of withdrawal of liquid reaction mixture from the reactor, and the rate of feed introduction, were controlled to maintain the volume of liquid reaction mixture in the reactor constant at three liters. The catalyst contained $H_3PO_4$, $BF_3$ and water in a molar ratio of 1:1:1. 275 grams of fraction "A" and 1175 grams of catalyst were introduced per hour into the reaction vessel. The CO pressure was kept at 100 atm. and the temperature in the reaction vessel at 60° C. The stirrer had a speed of 750 r.p.m. The average residence time of reactants in the reactor was 2½ to 3 hours.

The liquid reaction mixture drawn continuously from the reactor was introduced into a separator wherein it separated into two layers by stratification; a supernatant organic layer containing carboxylic acids, polymeric by-products and unconverted olefins, and a lower catalyst phase containing catalyst and polymeric by-products.

The catalyst phase was passed continuously from the separator into a catalyst drum to which water was recycled from within the system to adjust its composition to that of the defined catalyst. Catalyst is recycled from the catalyst drum to the reactor. A sample was taken from the catalyst drum every twenty-four hours and analyzed. Its organic (essentially polymeric) content is recorded in Table II, col. 6, below.

The carboxylic acid product was recovered through formation of its sodium salt from the supernatant organic layer formed in the separator receiving the liquid reactor effluence, and the content of carboxylic acid in said supernatant organic layer was determined, as follows:

The organic layer was drawn from the reactor effluence and the quantity thereof was continuously determined and recorded. This observed quantity is the value identified by the function "x" in the following Formula 1. The organic layer was then washed with water to wash out residual catalyst (the resulting wash water was used to adjust the catalyst composition in the catalyst drum as described in the preceding paragraph). A 25% aqueous caustic soda solution was then added to the washed organic layer in an excess of about 5% over that required to form the salt of the organic acid product. The resulting aqueous solution of sodium salts of organic acids is freed of organic matter (mainly unconverted olefins and some polymeric by-products) by stratification and subjected to liquid phase extraction with a light, aromatics-free gasoline acidified with HCl, and again with an aromatics-free gasoline. The gasoline was distilled from the extract obtained in the last extraction thereby obtaining the free carboxylic acids as distillation residue. The quantity of carboxylic acids so obtained is identified by the function "y" in the following Formula 1. The carboxylic acid product so obtained consisted essentially of a mixture of carboxylic acids of 9 to 11 carbon atoms to the molecule.

In a separate operation, identified herein as "Run B," the treated monoolefinic charge, fraction "B" was reacted with carbon monoxide and water under identical carboxylic acid-forming conditions as used in "Run B."

Run A was continued for eleven days. Run B was continued for seven days.

Results obtained in terms of percent of carboxylic acid present in the organic product layer formed in the separator receiving the liquid effluent stream from the reactor, and percent of organic material (polymeric) in the catalyst drum receiving the catalyst layer from the reactor effluence separator, are given for Runs "A" and "B" in the following Tables II and III, respectively.

The percentage of carboxylic acids in the washed organic product layer is given by the formula $$\frac{y}{x} \cdot 100\% \qquad (1)$$

Table II

"RUN A"

| Day | 1 | 2 | 3 | 4 | 5 | 6 | 7 | 8 | 9 | 10 | 11 |
|---|---|---|---|---|---|---|---|---|---|---|---|
| Carboxylic acids in product organic layer percent | 53.6 | 51.7 | 48.8 | 39.6 | 35.7 | 48.1 | 38.2 | 35.5 | 35.6 | 35.2 | 37.7 |
| Organic material (polymeric) in catalyst sample (percent) | 9.1 | 12.7 | 19.2 | 20.8 | 19.3 | 18.3 | 23.0 | 26.6 | 23.4 | | |

Table III

"RUN B"

| Day | 1 | 2 | 3 | 4 | 5 | 6 | 7 |
|---|---|---|---|---|---|---|---|
| Carboxylic acids in product organic layer percent | 61.5 | 60.3 | 57.5 | 58.6 | 60.9 | 61.4 | 62.9 |
| Organic material (polymeric) in catalyst sample (percent) | 12.8 | 11.5 | 10.2 | 13.4 | 8.2 | 7.0 | 9.0 |

It is seen from the foregoing example that the use of the untreated monolefinic charge results in a gradual and substantial decrease in the percentage of desired carboxylic acids in the product organic phase (Table II). Initial subjection of the charge to the removal of the polyethylenically unsaturated components results not only in a substantially higher percentage of desired carboxylic acids in the organic product layer under otherwise identical conditions, but additionally results in the maintaining of this high value substantially constant throughout the entire run (Table III).

It is also seen that when using the untreated feed the organic content (polymeric) of the catalyst rises constantly at a rapid rate (Table II). The use of feed pretreated in accordance with the invention, on the other hand, results in a substantially lower content of organic material in the catalyst. It is furthermore observed that when subjecting the monoolefinic charge to pretreatment in accordance with the invention the content of organic material in the catalyst gradually decreases from the initial value as the run proceeds.

Testing the product carboxylic acids for color indicated a less discoloration of the carboxylic acid product of "Run B" than that of "Run A."

We claim as our invention:

1. In the process for the production of carboxylic acids wherein a monoolefinic charge, consisting essentially of monoolefins having at least three carbon atoms to the molecule in admixture with polyethylenically unsaturated components, is reacted in the liquid phase with carbon monoxide and water at a temperature of from about −25° to about 100° C. and a pressure of from about 20 to about 150 atmospheres in the presence of a liquid highly acidic inorganic catalyst the step which comprises removing at least a substantial part of said polyethylenically unsaturated components from said monoolefinic charge before subjecting said monoolefinic charge to said reaction with carbon monoxide and water.

2. In the process for the production of carboxylic acids wherein a monoolefinic charge, consisting essentially of monoolefins having at least three carbon atoms to the molecule in admixture with polyethylenically unsaturated components, is reacted in the liquid phase with carbon monoxide and water at a temperature of from about −25° to about 100° C. and a pressure of from about 20 to about 150 atmospheres in the presence of a liquid highly acidic inorganic catalyst the step which comprises subjecting said monoolefinic charge to selective diene hydrocarbon hydrogenating conditions before subjecting said monoolefinic charge to said reaction with said carbon monoxide and water.

3. In the process for the production of a mixture of carboxylic acids having from about nine to about eleven carbon atoms to the molecule wherein an olefinic hydrocarbon fraction comprising monoolefins having from about eight to about ten carbon atoms to the molecule in admixture with diene hydrocarbons is reacted in liquid phase at a temperature of from about −10 to about 80° C. and a pressure of from about 20 to about 150 atmospheres in the presence of a liquid acidic catalyst consisting essentially of a boron trifluoride-polybasic acid complex, the improvement which comprises subjecting said olefinic hydrocarbon fraction to selective diene hydrocarbon hydrogenating conditions before reacting said olefinic hydrocarbon fraction with said carbon monoxide and water.

4. The process in accordance with claim 3 wherein said olefinic hydrocarbon fraction is subjected to said diene hydrocarbon hydrogenating conditions at a temperature of from about 300 to about 275° C. in the presence of a catalyst consisting essentially of nickel sulfide supported on alumina.

References Cited in the file of this patent

UNITED STATES PATENTS

| | | |
|---|---|---|
| 2,831,877 | Koch et al. | Apr. 22, 1958 |
| 2,906,790 | Smyth | Sept. 29, 1959 |